United States Patent
Matsuura et al.

(10) Patent No.: US 9,445,611 B2
(45) Date of Patent: Sep. 20, 2016

(54) SOY MILK CONTAINING FIBROUS MATERIAL AND TOFU-LIKE FOOD, PROCESSES FOR PRODUCTION OF THOSE PRODUCTS, AND DEHULLED SOYBEAN POWDER MATERIAL

(75) Inventors: Masaru Matsuura, Noda (JP); Masaki Sato, Gyoda (JP); Nobuhiro Hirasawa, Gyoda (JP); Sachiko Tadokoro, Gyoda (JP); Kenji Koga, Gyoda (JP)

(73) Assignee: ASAHI FOOD PROCESSING CO., LTD., Saitama (JP)

( * ) Notice: Subject to any disclaimer, the term of this patent is extended or adjusted under 35 U.S.C. 154(b) by 616 days.

(21) Appl. No.: 13/510,805

(22) PCT Filed: Dec. 9, 2010

(86) PCT No.: PCT/JP2010/072119
§ 371 (c)(1),
(2), (4) Date: May 18, 2012

(87) PCT Pub. No.: WO2011/071108
PCT Pub. Date: Jun. 16, 2011

(65) Prior Publication Data
US 2012/0231119 A1    Sep. 13, 2012

(30) Foreign Application Priority Data
Dec. 10, 2009  (JP) ................. 2009-280114

(51) Int. Cl.
| | |
|---|---|
| A23J 1/12 | (2006.01) |
| A23C 11/10 | (2006.01) |
| A23C 20/02 | (2006.01) |
| A23L 1/20 | (2006.01) |
| A23L 1/308 | (2006.01) |

(52) U.S. Cl.
CPC ........... *A23C 11/103* (2013.01); *A23C 20/025* (2013.01); *A23L 1/2006* (2013.01)

(58) Field of Classification Search
USPC ......................................................... 426/46
See application file for complete search history.

(56) References Cited

U.S. PATENT DOCUMENTS

2009/0123629 A1* 5/2009 Chang et al. ................. 426/573

FOREIGN PATENT DOCUMENTS

| | | |
|---|---|---|
| JP | 59-132865 A | 7/1984 |
| JP | 63-304960 A | 12/1988 |
| JP | 3-58263 B2 | 9/1991 |
| JP | 8-131112 A | 5/1996 |
| JP | 11-137201 A | 5/1999 |
| JP | 2000-102357 A | 4/2000 |
| JP | 2002-345425 A | 12/2002 |
| JP | 2003-23990 A | 1/2003 |
| JP | 2004-141155 A | 5/2004 |
| JP | 2006-129877 A | 5/2006 |
| JP | 3885196 B2 | 2/2007 |
| JP | 2007-135419 A | 6/2007 |

OTHER PUBLICATIONS

International Preliminary Report on Patentability for the Application No. PCT/JP2010/072119 mailed Mar. 1, 2011.
International Search Report for the Application No. PCT/JP2010/072119 mailed Mar. 1, 2011.
Numata, Kunio et al., "Quality of Soybean Curd Prepared from Fine Powder", Bulletin of the Tokyo Metropolitan Food Technology Research Center, 1997, No. 6, pp. 7-12.
Numata, Kunio et al., "Quality of Soybean Curd Prepared from Fine Powder", Bulletin of the Tokyo Metropolitan Food Technology Research Center, Mar. 1997, vol. 6, pp. 7-12.

* cited by examiner

*Primary Examiner* — Erik Kashnikow
*Assistant Examiner* — Philip Dubois
(74) *Attorney, Agent, or Firm* — Cheng Law Group, PLLC

(57) ABSTRACT

Provided are: tofu-like food and soy milk containing fibrous material, each of which has good texture and flavor and enables simultaneous intake of almost all of nutritional components in soybeans, such as proteins, lipids, glucides, fibrous material, minerals, vitamin components, and isoflavone compounds. Also provided is a process for producing soy milk containing fibrous material, which comprises the steps of: (A) dissolving and dispersing dehulled soybean powdery material having a nitrogen solubility index of 75 to 90, a lipoxygenase value of 30 to 120, an n-hexanal content of 0.5 ppm to 2 ppm, and a peroxide value of 0.2 meq/kg to 3.0 meq/kg in water to obtain dispersion; (B) subjecting the dispersion to heat treatment at 120° C. to 160° C. for 1 to 600 seconds; and (C) after the step (B), cooling the dispersion to 100° C. or lower and subjecting the resultant dispersion to emulsification and dispersion treatment under a pressure of 25 MPa to 200 MPa to produce soy milk containing fibrous material.

3 Claims, No Drawings

SOY MILK CONTAINING FIBROUS MATERIAL AND TOFU-LIKE FOOD, PROCESSES FOR PRODUCTION OF THOSE PRODUCTS, AND DEHULLED SOYBEAN POWDER MATERIAL

TECHNICAL FIELD

The present invention relates to soy milk containing fibrous material and tofu-like food, processes for manufacturing those products, and dehulled soybean powder material.

BACKGROUND ART

Soybeans have been processed into tofu (bean curd) or deep-fried tofu (deep-fried bean curd) and eaten as high-quality vegetable protein since early times. The soybeans contain water-soluble dietary fibers such as pectin and insoluble dietary fibers such as cellulose. The dietary fibers are classified into the water-soluble fibers and insoluble fibers, and the soybeans contain the insoluble dietary fibers in large amounts. Therefore, soybean fibers have been discarded as tofu refuse (bean curd refuse) in tofu manufacturing. The dietary fiber is a general term for indigestible components which are not digested with a human digestive enzyme, and in particular, the insoluble dietary fibers have been considered to be useless. In recent years, however, it has been suggested that the insoluble dietary fibers exert an effect of excreting food residues by absorbing water in a body to swell and stimulating the intestinal wall. The insoluble dietary fibers are considered to have an intestinal regulation effect necessary for modern eating habits. The tofu refuse, which is separated and discarded in a tofu manufacturing step, is the very insoluble fiber fraction in soybeans. Therefore, tofu industry participants have deeply desired that tofu containing insoluble soybean fibers is put into public circulation.

Therefore, soybean fiber-containing soy milk drink and tofu-like food have been developed actively. However, the soybean fiber-containing soy milk drink and tofu-like food have many problems to be solved in terms of quality, and have been marketed as only limited special products. In the late 1980's, instead of conventional methods involving pulverizing tofu refuse finely and blending the resultant in soy milk or tofu, there have been more frequently employed a method involving dehulling washed soybeans (Patent Document 1) and a method characterized in that fiber-containing soy milk drink or tofu-like food can be manufactured easily using finely pulverized soybean powder (Patent Document 2 and Patent Document 3), and tofu-like food has been sold actively in various regions. However, the soybeans contain 50 to 57% of linoleic acid and 5 to 9% of linolenic acid as unsaturated fatty acids. Therefore, autoxidation due to oxygen in air generated in a pulverization process or in storage of the powder and oxidation reactions of fatty acids due to a lipoxygenase contained in soybean seeds in the process of dissolving the soybeans in water are promoted to produce unpleasant odor (grassy smell) at a concentration significantly higher than that in usual tofu manufacturing. At the same time, oxidation reactions of soybean polyphenols are induced in dissolution of the powder, and hence unpleasant taste such as astringent taste is exhibited strongly. As mentioned above, conventional products each including soybean powder has critical disadvantages.

In order to solve such disadvantages, there is proposed a method of obtaining fiber-containing soy milk drink and tofu-like food by heating raw soybeans to thermally deactivate a lipoxygenase which is a lipid oxidase contained in soybean seeds in advance and pulverizing the soybeans finely (Patent Document 4). However, in the method, storage proteins contained in the soybean seeds are heat-denatured to decrease the water-soluble protein content in the powder because the raw soybeans are heated before pulverization. Therefore, in the case where fiber-containing tofu-like food is manufactured using the powder, it is very difficult to manufacture ideal tofu-like food because the gel strength of the protein is insufficient. In particular, as is the case with semi-aseptic type or aseptic type long life (LL) filled tofu, in the case where heat treatment is performed sufficiently in advance for pasteurization or sterilization of soybean fiber-containing soy milk, the gelling ability of soy milk is reduced to one-third of that in unheated one. Therefore, it becomes impossible to achieve gelation using only the tofu coagulant, and even if the soy milk is coagulated using a transglutaminase (TG) as a coagulation aid, the gelation depends on the coagulating ability of only the transglutaminase, resulting in a texture significantly different from tofu.

Fiber-containing soy milk and tofu-like food made from soybean powder have the following disadvantages in terms of texture as well. That is, the fiber-containing soy milk and tofu-like food are lack of smoothness required for conventional soy milk and tofu, and even if the powder particle size is adjusted to 100 micrometers or less, which is the minimum size of particles obtained commercially at present, uncomfortable feeling remains after eating because of the roughness of the powder particles. Therefore, it is very difficult to ingest fiber-containing soy milk or tofu in a required amount of about 100 to 200 g per meal, which is not acceptable to consumers in the actual circumstances.

In order to eliminate the roughness due to the insoluble fiber, it has been proposed that soy milk and tofu are manufactured by treating soybean powder with a fiber-degrading enzyme to obtain a soluble fraction and blending the resultant in original soy milk (Patent Document 5). However, in order to treat the soybean powder with the enzyme, it is necessary to perform enzymatic reactions for a long period of time around 50° C. which is an optimum reaction temperature for the enzyme. Therefore, it is necessary to find out how to suppress microorganism contamination in the step of reactions of the fiber-degrading enzyme added to a water dispersion of raw soybean powder. The soybeans are covered with soil-derived heat-resistant spore-forming bacteria, and the bacteria are transferred to soybean powder, which causes a very difficult problem in a countermeasure to the contaminant in the step. Further, the method requires a long-term enzymatic reaction time around 50° C., which promotes the action of a lipid oxidase derived from soybeans as well, inevitably resulting in deterioration of the flavor or the like. As mentioned above, in the methods proposed in the literature, it is very difficult to keep the quality of soy milk drink or a tofu-like product on a high level and to supply the drink or product stably at a low cost and a large scale.

Meanwhile, as a method of manufacturing fiber-containing soy milk drink or tofu-like food using soybean powder, there are proposed methods each involving dispersing powder in water and performing high-pressure homogenization treatment (for example, Patent Documents 6 and 7). However, in the proposed methods, the soybean powder is simply dispersed in water, and hence the action of an oxidase or the like contained in the soybean powder is caused. Even if emulsification treatment is performed in a short period of time, the emulsification action promotes enzymatic reactions, resulting in accumulation of substances causing unpleasant odor and unpleasant taste. Further, the high-pressure treatment increases the liquid temperature of the powder dispersion. For example, the product temperature increases by 8° C. at 25 MPa and by 10° C. at 50 MPa, and hence enzymatic actions are promoted with increase in the product temperature, resulting in further promotion of enzymatic oxidation.

Meanwhile, there is proposed a method involving using TG in combination with a tofu coagulant in manufacturing fiber-containing tofu using soybean powder (Patent Document 8). However, the proposed method includes dissolving soybean powder in water and heating the resultant dispersion substantially (according to Examples) at 100° C., and hence the gelation ability of the soybeans remains strongly. Even if coagulation thereof is performed with only the tofu coagulant, the tofu has roughness owing to soybean particles and has a lowered commercial value. Therefore, TG is used in combination with the coagulant, but in order to eliminate the roughness, a significant amount (0.1 to 0.3% by weight relative to the soybean powder dispersion) of TG should be used. Accordingly, the resultant tofu has extremely high elasticity which is completely different from the texture of tofu owing to a synergistic effect with the original gelation ability of soybeans. This is shown in a report on use of a tofu coagulant and TG in manufacturing fiber-containing tofu-like food using soybean powder (Non Patent Document 1), which describes that even if TG is used in combination, the resultant product has a rough texture and is inferior in smoothness compared with tofu containing no fibers, and that if the amount of TG added is increased to 0.15% or more, the resultant product has a pudding-like texture. That is, it has been recognized that, even if TG is used, it is difficult to manufacture fiber-containing tofu-like food having excellent texture.

PRIOR ART DOCUMENTS

Patent Document

Patent Document 1: JP 03-58263 B2
Patent Document 2: JP 08-131112 A
Patent Document 3: JP 11-137201 A
Patent Document 4: JP 3885196 B2
Patent Document 5: JP 2007-135419 A
Patent Document 6: JP 2000-102357 A
Patent Document 7: JP 2002-345425 A
Patent Document 8: JP 2003-23990 A Non Patent Document Non Patent Document 1: Bulletin of the Tokyo Metropolitan Food Technology Research Center, No. 6, 7-12, 1997

SUMMARY OF INVENTION

Technical Problem

An object of the present invention is to provide fiber-containing tofu-like food which has good texture and flavor and enables simultaneous intake of almost all of nutritional components in soybeans, such as proteins, lipids, glucides, fibers, minerals, vitamins, and isoflavone compounds, and a manufacturing method for the fiber-containing tofu-like food. Another object of the present invention is to provide fiber-containing soy milk which contains large amounts of soybean nutritional components and soybean fibers, has good flavor, and is suitably used in soy milk drink or food made from soy milk, and a manufacturing method for the fiber-containing soy milk. Still another object of the present invention is to provide a dehulled soybean powder material suitable as material for production of the fiber-containing soy milk.

Means for Solving the Problem

The inventors of the present invention have made intensive studies to achieve the object, and as a result, have found out that a tofu-like product which has good texture and flavor and contains large amounts of soybean nutritional components and soybean fibers can be obtained by using fiber-containing soy milk obtained by, through the use of dehulled soybean powder material having a nitrogen solubility index, a lipoxygenase value, an n-hexanal content, and a peroxide value in specific ranges, dissolving and dispersing the dehulled soybean powder material in water to obtain a dispersion, subjecting the dispersion to heat treatment under specific conditions, cooling the dispersion to 100° C. or less, and subjecting the dispersion to emulsification and dispersion treatment under a specific pressure condition.

That is, a manufacturing method for fiber-containing soy milk according to the present invention includes the following steps of: (A) dissolving and dispersing dehulled soybean powder material having a nitrogen solubility index of 75 or more and 90 or less, a lipoxygenase value of 30 or more and 120 or less, an n-hexanal content of 0.5 ppm or more and 2 ppm or less, and a peroxide value of 0.2 meq/kg or more and 3.0 meq/kg or less in water to obtain a dispersion; (B) subjecting the dispersion to heat treatment at 120° C. to 160° C. for 1 to 600 seconds; and (C) after the step (B), cooling the dispersion to 100° C. or less and subjecting the dispersion to emulsification and dispersion treatment under a pressure of 25 MPa to 200 MPa to produce fiber-containing soy milk.

The dehulled soybean powder material is suitably manufactured by a method including the following steps of: (a1) subjecting raw whole soybeans to dehulling treatment to produce dehulled soybeans; and (a2) pulverizing the dehulled soybeans using a pulverizer equipped with a pneumatic machine to produce a dehulled soybean powder.

The manufacturing method preferably includes, before the step (B), the step of (b) subjecting the dispersion to heat treatment at 65° C. to 115° C. for 5 to 180 seconds.

Fiber-containing soy milk of the present invention is manufactured by the method for manufacturing fiber-containing soy milk according to the present invention.

A manufacturing method for tofu-like food according to the present invention includes using the fiber-containing soy milk of the present invention.

The manufacturing method for tofu-like food according to the present invention suitably includes the following steps of: adding and mixing a tofu coagulant and a transglutaminase to the fiber-containing soy milk of the present invention; and coagulating the resultant by heating to produce fiber-containing tofu-like food.

Tofu-like food of the present invention is manufactured by the manufacturing method for tofu-like food according to the present invention.

Dehulled soybean powder material of the present invention has a nitrogen solubility index of 75 or more and 90 or less, a lipoxygenase value of 30 or more and 120 or less, an n-hexanal content of 0.5 ppm or more and 2 ppm or less, and a peroxide value of 0.2 meq/kg or more and 3.0 meq/kg or less.

Advantageous Effects of Invention

According to the present invention, it is possible to provide the tofu-like food which has good texture and flavor and enables simultaneous intake of almost all of nutritional components in soybeans, such as proteins, lipids, glucides, fibers, minerals, vitamins, and isoflavone compounds. Further, according to the present invention, it is possible to provide the tofu-like food which has no so-called unpleasant odor (such as grassy smell or paint smell) due to oxidation of soybean lipids, no astringent taste due to oxidation of soybean polyphenols, and no harsh taste derived from isoflavone compounds, and has sweet, rich, and good taste.

Further, according to the present invention, it is possible to provide the fiber-containing soy milk which contains large amounts of soybean nutritional components and soybean fibers, has good flavor, and is suitably used in soy milk drink or food made from soy milk. The fiber-containing soy milk of the present invention can be used in a variety of food made from soy milk, and in particular, the fiber-containing soy milk is suitably used in production of tofu-like food.

DESCRIPTION OF EMBODIMENTS

Hereinafter, embodiments of the present invention are described but are shown for illustrative purposes, and it is obvious that various modifications may be made without departing from the technical idea of the present invention.

A manufacturing method for fiber-containing soy milk according to the present invention includes the following steps (A) to (C):

(A) dissolving and dispersing a dehulled soybean powder material having a nitrogen solubility index of 75 or more and 90 or less, a lipoxygenase value of 30 or more and 120 or less, an n-hexanal content of 0.5 ppm or more and 2 ppm or less, and a peroxide value of 0.2 meq/kg or more and 3.0 meq/kg or less in water to obtain a dispersion;

(B) subjecting the dispersion to heat treatment at 120° C. to 160° C. for 1 to 600 seconds; and (C) after the step (B), cooling the dispersion to 100° C. or less and subjecting the dispersion to emulsification and dispersion treatment under a pressure of 25 MPa to 200 MPa to produce fiber-containing soy milk.

First, dehulled soybean powder material having a nitrogen solubility index of 75 or more and 90 or less, a lipoxygenase value of 30 or more and 120 or less, an n-hexanal content of 0.5 ppm or more and 2 ppm or less, and a peroxide value of 0.2 meq/kg or more and 3.0 meq/kg or less is prepared.

The dehulled soybean powder material used in the present invention needs to be similar to raw soybeans, and in order to produce fiber-containing tofu-like food, which has excellent texture, it is important that the material have property in a certain condition range. Therefore, when the property is expressed by a nitrogen solubility index (hereinafter, referred to as "NSI") as an indicator, the NSI is 75 or more and 90 or less, preferably 78 or more and 90 or less, more preferably 80 or more and 90 or less.

In addition, in the dehulled soybean powder material used in the present invention, it is essential that autoxidation of soybean lipids and enzymatic oxidation by a lipoxygenase contained in soybeans in a pulverization step and in a storage process be suppressed as much as possible. In order to achieve that, the peroxide value of soybean lipids (hereinafter, referred to as "POV") of the dehulled soybean powder material used in the present invention, which is an indicator thereof, is 0.2 meq/kg or more and 3.0 meq/kg or less, preferably 2.0 meq/kg or less, more preferably 1.0 meq/kg or less. In the process of dissolving the dehulled soybean powder material in water, lipids which adhere to the surface of the powder are easily affected by the lipoxygenase eluted from the powder into water and cause an increase in the "POV" and an increase in the amount of n-hexanal in the product. That is, fiber-containing soy milk and tofu-like food manufactured using soybean powder material having a "POV" of more than 3.0 meq/kg have strong so-called unpleasant odor and unpleasant taste and have reduced commercial values.

Meanwhile, the lipoxygenase value (hereinafter, referred to as "LOX value") of the dehulled soybean powder material is 30 or more and 120 or less, preferably 40 or more and 100 or less, more preferably 40 or more and 70 or less.

Further, the n-hexanal content of the dehulled soybean powder material is 0.5 ppm or more and 2 ppm or less, preferably 0.5 ppm or more and 1.5 ppm or less, more preferably 0.5 ppm or more and 1 ppm or less.

The particle size of the dehulled soybean powder material used in the present invention is not particularly limited, but the cumulative particle size from the minimum particle size of powder particles ($D_{50}$) is preferably 200 μm or less, more preferably 100 μm or less, still more preferably 20 μm or more and 80 μm or less.

A method of obtaining the dehulled soybean powder material is not particularly limited, and the dehulled soybean powder material may be suitably manufactured by a method including the following steps of: (a1) subjecting raw whole soybeans to dehulling treatment to produce dehulled soybeans; and (a2) pulverizing the dehulled soybeans using a pulverizer equipped with a pneumatic machine to produce dehulled soybean powder.

A method of removing the seed coats of raw whole soybeans by dehulling treatment in the step (a1) is not particularly limited, and there may be employed a known dehulling method such as a grinding method, a dry fracture method, a polishing method using a millstone, or an instantaneous heating method. Of those, an instantaneous heating method using an instantaneous heating dehulling device is preferred. In the instantaneous heating method, raw whole soybeans are heated in a heater (by an indirect heating method using steam or flame of gas such as propane) to about 65 to 98° C., and a rubber roller is passed immediately, followed by cooling. The resultant is subjected to sieving or winnowing to separately collect seed coats, cotyledons, and germs. The instantaneous heating method causes less physical damage to the soybean cotyledons and can produce high-quality dehulled soybeans in which oxidation of soybean lipids is suppressed. However, the dehulled soybeans themselves are easily oxidized, and hence it is desirable to pulverize the soybeans immediately after the dehulling treatment.

In the present invention, the dehulling rate of the dehulled soybeans is not particularly limited, and is preferably 85% or more, more preferably 90% or more, still more preferably 95% or more.

The soybeans used in the present invention may be any of domestic soybeans, foreign-grown soybeans, lipoxygenase-deficient soybeans, soybeans enriched with a soybean protein such as 11S or 7S, and the like as long as the soybeans are usually used as raw material soybeans for soy milk drink or tofu.

In the step (a2), when a pulverizer equipped with a pneumatic machine, which can generate high-speed air swirling vortex flow in a pulverization room, is used, oxidation of soybean lipids in the soybean pulverization step can be suppressed. In the pneumatic pulverizer, in general, soybeans collide with each other and are crushed by high-speed air flow generated in the pulverization room. Therefore, the pneumatic pulverizer causes less direct damage to soybean tissues compared with a conventional pulverization method involving giving a direct impact to soybeans by a metallic high-speed rotator to crush the soybeans. When the soybean tissue is directly damaged by the metallic high-speed rotator in the pulverization room, lipids ooze out from the soybean tissue and are oxidized by air, resulting in problems such as an increase in the "POV" of the powder and generation of unpleasant odor like the smell of n-hexanal.

The pulverizer equipped with a pneumatic machine used in the step (a2) may be a known pulverizer equipped with a pneumatic machine and is not particularly limited. Examples thereof include pulverizers described in JP 3739303 B2, JP 3725330 B2, and JP 3701632 B2. The pulverizers equipped with a pneumatic machine are revised in many ways in their mechanisms for generating high-speed air flow in the pulverization room, and are broadly classified into a jet-mill system and a turbo mill system. The jet-mill system is equipped with no drive part and is used for finely pulverizing particles by the collision and friction of the particles only by compressed air. The turbo-mill system is equipped with a rapidly rotating rotor and is used for finely pulverizing particles by impact and shearing by ultrahigh-speed air swirling vortex flow. The pulverizer used in the present invention may adopt any of the systems and is suitably one which causes less direct damage to the cross-section of soybean powder by a metal or the like and suppresses oozing of soybean lipids. Further, the pulverizer is preferably one which has high production efficiency, endures long-term running, provides an excellent collection rate of soybean powder, and can be increased in size for large-scale production. In addition, in order to suppress oxidation of soybean lipids due to exposure to air in the pulverization step, the pulverizer is more suitably designed depending on purposes so as to decrease the "POV" of the powder by, for example, a system involving performing pulverization in nitrogen gas stream and by nitrogen replacement in the collected powder.

The dehulled soybean powder material is dissolved and dispersed in water to obtain a dispersion (step (A)). As a method of obtaining a dispersion in the step (A), there is given, for example, a method involving adding water to the dehulled soybean powder material at a predetermined ratio and dispersing and mixing the material to obtain a dispersion. The temperature condition is not particularly limited, and the method is usually performed at normal temperature. However, the method is preferably performed at low temperature as long as the process of dissolving and dispersing the material is not inhibited significantly. A solid matter concentration in the dispersion is preferably 5 to 20% by mass, more preferably 10 to 15% by mass. Meanwhile, a crude protein concentration in the dispersion is preferably 2 to 10% by mass, more preferably 3 to 7% by mass.

The resultant water dispersion is subjected to heat treatment at 120° C. to 160° C. for 1 to 600 seconds (step (B)). In the case of pasteurization of the dispersion, the dispersion is suitably subjected to heat treatment at a temperature within the range of 120° C. to 140° C. for a predetermined period of time, while in the case of sterilization of the dispersion, the dispersion is suitably subjected to heat treatment at a temperature of 145° C. or more and 160° C. or less. Long-life fiber-containing soy milk drink or tofu-like food needs to be subjected to heat treatment at a temperature necessary for sterilization. Feeding of the dispersion to a decompression device immediately after the heat treatment to perform deaeration treatment can provide a preferred effect in terms of quality.

In the present invention, it is desirable to prevent retention in the respective steps as much as possible and to immediately perform the heat treatment step by rapidly dissolving and dispersing the dehulled soybean powder material in water. When water is added to the dehulled soybean powder material, a lipoxygenase which is a lipid oxidase is eluted from the dehulled soybean powder material, and lipid oxidation is inevitably promoted because the mixture contains a large amount of air. Therefore, in the present invention, it is desirable that the step (B) be performed immediately after the step (A).

In the case where it is difficult to rapidly increase the temperature of the dispersion obtained in the step (A) up to 120° C. to 160° C. because of the equipment, the step (B) may be performed after the step of (b) performing heat treatment for the dispersion at 65° C. to 115° C. for 1 to 300 seconds, preferably 5 to 180 seconds after the step (A). In the preliminary heating, heat treatment is performed under a condition of 65° C. or more, which is beyond a range where an enzyme contained in soybeans can act, in order to suppress the action of an oxidase or the like contained in the dehulled soybean powder material. In the case where the step (b) is performed, the step (b) is preferably performed immediately after the step (A), and the step (B) is preferably performed immediately after the step (b). Exposure of the dispersion after the preliminary heating to external air should be avoided because deterioration of the flavor is promoted.

After the step (B), the dispersion is cooled to 100° C. or less, and subjected to emulsification and dispersion treatment under a pressure of 25 MPa to 200 MPa to produce fiber-containing soy milk (step (C)).

In the present invention, the dispersion is subjected to heat treatment at 120° C. to 160° C. for a predetermined period of time and fed to a decompression device, and the dispersion cooled to 100° C. or less, preferably 20° C. or more and less than 100° C., more preferably 50° C. or more and less than 90° C. is subjected to emulsification and dispersion treatment (high-pressure homogenization treatment) under a pressure of 25 MPa to 200 MPa, preferably 50 to 200 MPa, more preferably 75 to 100 MPa. In the present invention, after the step (B), the step (C) is suitably performed continuously.

In the present invention, the emulsification treatment is performed under high pressure after the heat treatment. As a result, a product having less unpleasant odor and unpleasant taste can be produced because the actions caused by a group of enzymes contained in soybeans, such as a lipoxygenase, a polyphenol oxidase, and a β-glucosidase, in the emulsification step can be completely suppressed.

It can be said that the emulsification treatment performed in a state where the group of enzymes contained in soybeans are deactivated by heating and dissolved oxygen is removed is very preferred as the treatment step because factors of quality deterioration are eliminated sufficiently. In addition, the emulsification treatment promotes re-dispersion of proteins which are partially insolubilized by the heat treatment under high temperature for pasteurization or sterilization and fibers which aggregate thereby, and miniaturization of the fibers.

Conventionally, when heat treatment is performed in a high temperature range, a part of proteins in soy milk aggregates and is insolubilized. Therefore, a method involving performing emulsification treatment at about 25 MPa in order to promote re-dispersion is generally adopted. The present invention has found the following effect. That is, when high-pressure homogenization treatment is performed at 25 MPa or more and 200 MPa or less after high-temperature heat treatment at 120° C. to 160° C., it is possible to miniaturize soybean fibers in soy milk and to provide high-quality flavor. The effect can never be achieved by a conventionally known combination with high-pressure homogenization treatment performed in a temperature range around 100° C.

When the emulsification and dispersion treatment is performed, fiber-containing soy milk is produced. The fiber-containing soy milk of the present invention is manufactured by the manufacturing method for fiber-containing soy milk according to the present invention.

The fiber-containing soy milk of the present invention, obtained by the method according to the present invention, contains tofu refuse and insoluble fibers of soybeans.

The solid matter concentration of the fiber-containing soy milk of the present invention is preferably 5 to 20% by mass, more preferably 10 to 15% by mass. The crude protein concentration of the fiber-containing soy milk of the present invention is preferably 2 to 10% by mass, more preferably 3 to 7% by mass.

The fiber-containing soy milk of the present invention contains large amounts of soybean nutritional components and soybean fibers, has good flavor, and can be used in a variety of food made from soy milk drink or soy milk. In particular, the fiber-containing soy milk is suitably used in production of tofu-like food.

The tofu-like food of the present invention can be manufactured by using the fiber-containing soy milk of the present invention. The manufacturing method for tofu-like food according to the present invention is not particularly limited, and the tofu-like food of the present invention can be manufactured by a known manufacturing method for tofu using the fiber-containing soy milk of the present invention.

The manufacturing method for tofu-like food according to the present invention suitably includes the following steps of: cooling fiber-containing soy milk obtained by the manufacturing method for fiber-containing soy milk according to the present invention; adding and mixing a tofu coagulant and a transglutaminase (TG) to the fiber-containing soy milk; and coagulating the mixture by heating to produce fiber-containing tofu-like food.

As the tofu coagulant, a known tofu coagulant may be used, and for example, one or more kinds of coagulants selected from the group consisting of magnesium chloride, calcium chloride, crude magnesium chloride (sea water), calcium sulfate, magnesium sulfate, and glucono delta-lactone are suitably used. The amount of the tofu coagulant added is suitably 0.01 to 0.5% by mass relative to the fiber-containing soy milk.

As the transglutaminase, a known transglutaminase may be used, and examples thereof include Activa Super Curd manufactured by Ajinomoto Co., Inc. The amount of the transglutaminase added is suitably 0.01 to 0.2% by mass relative to the fiber-containing soy milk.

The conditions of the heat treatment performed after addition of the tofu coagulant and transglutaminase are not particularly limited. For example, the fiber-containing tofu-like food is suitably produced by filling a plastic container for tofu with fiber-containing soy milk after addition of the tofu coagulant and transglutaminase, sealing the container, subjecting the resultant to heat treatment at 40 to 60° C. for 10 to 100 minutes, subjecting the resultant to heat treatment at 80 to 90° C. for 30 to 90 minutes, and cooling the resultant immediately.

In the present invention, when the series of steps are performed, it is possible to produce tofu which has no elastic texture and matches the consumer's preferences even if TG is used at a concentration of 0.15% or more. Further, the dehulled soybean powder material used in the present invention has an NSI index of 75 or more, and hence a water dispersion of soybean powder having a gelling ability similar to that of raw whole soybeans can be obtained. When the dispersion is subjected to heat treatment at 120 to 160° C. for a predetermined period of time, it is possible to achieve pasteurization or sterilization of the dispersion and to lower the original gelling ability of the soybean powder to an appropriate level to adjust the tofu texture to a texture preferred by consumers in combination with the tofu coagulant and TG.

The tofu-like food of the present invention is manufactured by using soy milk containing tofu refuse and large amounts of soybean fibers and soybean nutritional components. Therefore, an excellent effect that the food contains large amounts of soybean fibers and soybean nutritional components and has good texture and flavor is provided.

EXAMPLES

Hereinafter, the present invention is described more specifically by way of examples, but it is obvious that the examples are shown for illustrative purposes and should not be construed to limit the scope of the invention.

Example 1

Domestic soybeans (trade name: Tachinagaha) were heated using an instantaneous heating dehulling device (manufactured by Harada Sangyo Co., Ltd.) so that the surface temperature of the soybeans reached 70° C., and were then immediately passed between two opposing rubber rollers to separate cotyledon part into two parts. The resultant was cooled under cool air and passed through a rotating drum where a stainless-steel net having projections on its inside was spread to separate the cooled product into three kinds of parts, i.e., seed coats, germs, and cotyledons. The germs were discharged to the outside of the rotating drum, and the seed coats were removed in the subsequent wind winnowing step to collect only the cotyledon part. The dehulling rate of the dehulled soybeans (cotyledon part) collected through the procedure was found to be 95%. The dehulled soybeans were pulverized using a pneumatic pulverizer (manufactured by Shizuoka-Plant Co., Ltd.) so that the cumulative particle size from the minimum particle size of powder particles ($D_{50}$) was 25 μm. The resultant soybean powder was found to have an "NSI" of 78, a "POV" of 1 meq/kg, an n-hexanal content of 1.5 ppm, and an "LOX value" of 55. Table 1 shows the soybean dehulling conditions and measurement values of the dehulled soybean powder.

The values used as quality indices of the soybean powder were determined by the following analysis methods.

"NSF" (Nitrogen Solubility Index): a nitrogen solubility index determined in accordance with an analysis method of The American Oil Chemists' Society (AOCS).

"POV" (Peroxide Value): a peroxide value determined in accordance with "The JOCS Standard Methods for the Analysis of Fats, Oils and Related Materials" published by Japan Oil Chemists' Society.

"n-Hexanal content": measured by gas chromatography mass spectrometry.

"LOX value": a lipoxygenase value measured in accordance with an analysis method described in K. Kitamura, Agric. Biol. Chem., 48(9), 2339-2346, 1984.

The particle size of the dehulled soybean powder was determined by measuring the cumulative particle size from the minimum particle size of powder particles ($D_{50}$) by a dry laser method using AEROTRAC SPR7340 manufactured by Nikkiso Co., Ltd.

To the soybean powder was added water at 18° C. at a ratio of 1:6 (w/w), and the powder was dispersed by mixing to obtain dispersion. Subsequently, the dispersion was subjected to heat treatment at 125° C. for 120 seconds and immediately fed to a vacuum chamber to cool the dispersion to 80° C. Then, the dispersion was subjected to emulsification treatment at 25 MPa using a high-pressure homogenizer (manufactured by APV Systems Ltd.) and then cooled to 10° C. or less, to thereby obtain fiber-containing soy milk of the present invention.

The fiber-containing soy milk was found to have a solid matter concentration of 12%, a crude protein concentration of 4.5% (the value was calculated by multiplying the total nitrogen concentration by 5.71 as a coefficient), a pH of 6.61, and a viscosity of 52 mPa·s. Table 2 shows the measurement values of the fiber-containing soy milk. It should be noted that the viscosity was measured at 20° C. using a Brookfield viscometer type B8M (manufactured by Tokyo Keiki Inc.).

A magnesium chloride preparation and TG (Activa Super Curd manufactured by Ajinomoto Co., Inc.) were added to the soy milk at concentrations of 0.3% (w/w) and 0.2%, respectively, and the resultant was mixed. Subsequently, a plastic container (made of polypropylene, hereinafter, referred to as "PP container") was filled with the mixture, sealed, subjected to heat treatment at 50° C. for 60 minutes and at 85° C. for 60 minutes, and cooled, to thereby obtain a tofu sample as the tofu-like food of the present invention.

For the resultant tofu sample, a texture analysis (Journal of the Japanese Society for Food Science and Technology, Vol. 43, No. 9, 1042-1048, 1996) was performed using TENSIPRESSER (manufactured by Taketomo Electric Inc.). Table 3 shows the results.

In the texture analysis, "hardness" was evaluated as the hardness at one bite.

"Coagulability" was defined to be half the amount of work determined when a sample cut into a 1.7 cm square was compressed ten times up to the height of 50% using a disk-shaped plunger having a diameter of 5 cm.

"Denseness" and "brittleness" were evaluated by a multi-biting Rise method. The multi-biting Rise method is a technique introduced for analyzing the tofu of the present invention, and is a method involving gradually breaking tofu tissue by repeating the following procedure 100 to 150 times: inserting a pipe-like plunger into the tofu by 0.2 mm; drawing the plunger back by 1 mm; and further inserting the plunger by 0.2 mm from the inserted position in the tofu. According to this method, it is possible to determine characteristic tofu tissue in the case of using TG.

A value represented as "denseness" is measured to be characteristically high for tofu obtained by using TG.

A value represented as "brittleness" is measured to be characteristically high to tofu containing fibers, and can be used as an index of "roughness." According to the results of previous studies, when the "brittleness" value exceeded 2.5, all persons felt the product to be "rough" and judge the product to have no commercial value.

Further, for each of the tofu sample obtained in Example 1 and tofu samples obtained in Examples 2 and 3 and Comparative Examples 1 and 2 below, sensory evaluations of an unpleasant odor, unpleasant taste, and deliciousness were performed. The sensory evaluations were performed after the tofu sample in sealed container was placed for one hour under running water to return to ordinary temperature. For the tofu samples of Examples 1 to 3 and Comparative Examples 1 and 2, a panel of ten specialists performed comparative evaluations. The strengths of the unpleasant odor and unpleasant taste were evaluated on a five-grade scale ranging from score 1 (weak) to score 5 (strong). The deliciousness was evaluated on a five-grade scale ranging from score 1 (bad taste) to score 5 (good taste). Table 3 shows the results.

Examples 2 and 3

Experiments were performed in the same manner as in Example 1 except that, in the dehulling step in the manufacturing of the dehulled soybean powder, the temperature for heating the soybean surfaces using the instantaneous heating dehulling device was changed to 65° C. in Example 2 and 74° C. in Example 3. Tables 1 to 3 show the results.

Comparative Example 1

The same soybeans as those in Example 1 were dehulled using a millstone-type polishing dehulling device having corkscrew-like grooves (manufactured by Harada Sangyo Co., Ltd.) so that the soybean seed coats were shaved. The dehulling rate was found to be 90%. The dehulled soybeans were treated using the pneumatic pulverizer used in Example 1 to adjust the pulverized particle size so as to be the same as that of Example 1, to thereby obtain soybean powder. The resultant soybean powder was found to have an "NSI" of 90, a "POV" of 1.5 meq/kg, an n-hexanal content of 3 ppm, and an "LOX value" of 145. Table 1 shows the soybean dehulling conditions and measurement values of the dehulled soybean powder.

Further, the powder was treated in the same way as in Example 1, to thereby obtain fiber-containing soy milk having its solid matter content and protein concentration adjusted so as to be the same as those in Example 1, and tofu-like food was obtained in the same way as in Example 1. For the resultant fiber-containing soy milk and tofu-like food, measurement was performed in the same way as in Example 1. Tables 2 and 3 show the results.

Comparative Example 2

The same soybeans as those in Example 1 were directly treated using the pneumatic pulverizer without performing the dehulling treatment, to thereby obtain soybean powder including 100% of soybean seed coats and having the same pulverized particle size as that in Example 1. The resultant soybean powder was found to have an "NSI" of 91, a "POV" of 1.1 meq/Kg, an n-hexanal content of 2.0 ppm, and an "LOX value" of 149. Table 1 shows the soybean dehulling conditions and measurement values of the dehulled soybean powder.

Further, the powder was treated in the same way as in Example 1, to thereby obtain fiber-containing soy milk having its solid matter content and protein concentration adjusted so as to be the same as those in Example 1, and tofu-like food was obtained in the same way as in Example 1. For the resultant fiber-containing soy milk and tofu-like food, measurement was performed in the same way as in Example 1. Tables 2 and 3 show the results.

TABLE 1

| | Dehulling condition | | | | Soybean powder | |
| --- | --- | --- | --- | --- | --- | --- |
| | Dehulling method | Dehulling rate (%) | NSI | LOX value | n-Hexanal (ppm) | POV (meq/kg) |
| Example 1 | Instantaneous heating method | 95 | 78 | 55 | 1.5 | 1.0 |
| Example 2 | Instantaneous heating method | 95 | 90 | 120 | 1.9 | 1.3 |
| Example 3 | Instantaneous heating method | 95 | 75 | 30 | 0.5 | 0.5 |
| Comparative Example 1 | Millstone polishing method | 90 | 90 | 145 | 3.0 | 1.5 |
| Comparative Example 2 | — | | 0 | 91 | 149 | 2.0 | 1.1 |

TABLE 2

| | Fiber-containing soy milk | | |
| --- | --- | --- | --- |
| | pH | Viscosity (mPa·s) | Crude protein (%) |
| Example 1 | 6.61 | 52 | 4.50 |
| Example 2 | 6.66 | 46 | 4.50 |
| Example 3 | 6.62 | 28 | 4.51 |
| Comparative Example 1 | 6.63 | 83 | 4.51 |
| Comparative Example 2 | 6.65 | 132 | 4.53 |

TABLE 3

| | Tofu-like food | | | | | | |
| --- | --- | --- | --- | --- | --- | --- | --- |
| | Texture analysis | | | | Sensory evaluation | | |
| | Hardness [gw/cm$^2$] | Coagulability [gw·cm/cm$^2$] | Denseness [gw/cm$^2$] | Brittleness | Unpleasant odor | Unpleasant taste | Deliciousness |
| Example 1 | 336 | 160 | 781 | 1.95 | 2.6 | 2.5 | 4.0 |
| Example 2 | 376 | 162 | 846 | 1.60 | 2.9 | 2.7 | 3.8 |
| Example 3 | 297 | 146 | 604 | 2.31 | 2.1 | 2.2 | 4.1 |
| Comparative Example 1 | 231 | 165 | 547 | 2.88 | 4.5 | 4.4 | 1.5 |
| Comparative Example 2 | 118 | 68 | 336 | 3.49 | 4.6 | 4.6 | 1.9 |

As shown in Tables 1 to 3, the tofu-like food of each of Examples 1 to 3, which was obtained by using the dehulled soybean powder material of the present invention and had a nitrogen solubility index, a lipoxygenase value, an n-hexanal content, and a peroxide value in the respective specific ranges, was found to be tofu-like food having excellent texture and flavor and containing large amounts of soybean nutritional components and soybean fibers.

Example 4

To dehulled soybean powder material obtained in the same way as in Example 1 was added water at 18° C. at a ratio of 1:6 (w/w), and the material was dispersed by mixing. The resultant dispersion was subjected to heat treatment at 145° C. for 5 seconds, fed to a vacuum chamber to cool the dispersion to 82° C., and subjected to emulsification treatment under a high pressure of 25 MPa, to thereby obtain fiber-containing soy milk. The resultant fiber-containing soy milk was cooled at 10° C. or less and then treated in the same way as in Example 1, to thereby obtain tofu-like food.

For the resultant fiber-containing soy milk and tofu-like food, measurement was performed in the same way as in Example 1. Tables 4 and 5 show the results.

In addition, sensory evaluations relating to unpleasant odor, unpleasant taste, and deliciousness were performed in the same way as in Example 1, and a comparative evaluation was performed for the tofu-like food obtained in Example 4 and Experimental Example 1 below. Table 5 shows the results.

Experimental Example 1

Water dispersion of dehulled soybean powder material prepared in the same way as in Example 4 was subjected to emulsification treatment under a high pressure of 25 MPa. The emulsification treatment liquid was subjected to heat treatment at 145° C. for 5 seconds, fed to a vacuum chamber, and cooled to 85° C., to thereby obtain fiber-containing soy milk. The resultant fiber-containing soy milk was cooled at 10° C. or less and then treated in the same way as in Example 1, to thereby obtain tofu-like food. For the resultant fiber-containing soy milk and tofu-like food, measurement was performed in the same way as in Example 4. Tables 4 and 5 show the results.

TABLE 4

| | Fiber-containing soy milk | | |
| --- | --- | --- | --- |
| | pH | Viscosity (mPa·s) | Crude protein (%) |
| Example 4 | 6.60 | 75 | 4.50 |
| Experimental Example 1 | 6.56 | 117 | 4.52 |

TABLE 5

| | | | Tofu-like food | | | | | | |
|---|---|---|---|---|---|---|---|---|---|
| | | | Texture analysis | | | | Sensory evaluation | | |
| | POV (meq/kg) | n-Hexanal (ppm) | Hardness [gw/cm$^2$] | Coagulability [gw · cm/cm$^2$] | Denseness [gw/cm$^2$] | Brittleness | Unpleasant odor | Unpleasant taste | Deliciousness |
| Example 4 | 5.2 | 2.5 | 351 | 170 | 627 | 2.23 | 3.0 | 2.4 | 4.2 |
| Experimental Example 1 | 10.6 | 6.8 | 222 | 123 | 373 | 2.78 | 4.1 | 4.5 | 1.7 |

As shown in Table 5, the tofu-like food of Example 4 was found to be tofu-like food having excellent texture and flavor and containing large amounts of soybean fibers and soybean nutritional components. The POV value and n-hexanal content of the tofu-like food of Experimental Example 1 were each found to be higher than that of the tofu-like food of Example 4. In addition, the results of the sensory evaluations show that the tofu-like food of Experimental Example 1 has strong unpleasant odor and strong unpleasant taste such as astringent taste compared with the tofu-like food of Example 4.

Example 5

The dehulled soybean powder material obtained in Example 1 was dissolved and dispersed in water at 20° C. at a soybean powder:water ratio of 1:6. The dispersion was heated at 120° C. for 120 seconds, fed to a vacuum chamber, and cooled to 60° C. The resultant was emulsified under a pressure of 50 MPa and cooled to 10° C. or less, to thereby obtain fiber-containing soy milk.

Tofu-like food was obtained using the resultant fiber-containing soy milk in the same manner as in Example 1 except that the amount of the magnesium chloride preparation added was changed to 0.3% (w/w), and the amount of TG added was changed to 0.15% (Example 5-1) or 0.2% (Example 5-2).

For the resultant fiber-containing soy milk and tofu-like food, measurement was performed in the same way as in Example 1. Tables 6 and 7 show the results.

Further, for the resultant tofu-like food, a panel of ten specialists performed sensory evaluations of "hardness" and "smoothness". It should be noted that each of the sensory evaluations was performed by using tofu in a sealed pack, which had been placed under running water for 1 hour. The hardness was evaluated based on such evaluation criteria that tofu having low hardness was given a score of 1, and the score increased up to 5 with an increase in the hardness. The smoothness was evaluated based on such evaluation criteria that the smoothest tofu was given a score of 5, and the score decreased down to 1 in order of smoothness. Table 7 shows the results.

Experimental Example 2

Tofu-like food was obtained under the same conditions as those in Example 5 except that the treatment conditions of the heat treatment of the water dispersion of the dehulled soybean powder material changed to 100° C. and 240 seconds. For the resultant fiber-containing soy milk and tofu-like food, measurement was performed in the same way as in Example 5. Tables 6 and 7 show the results.

TABLE 6

| | Fiber-containing soy milk | | |
|---|---|---|---|
| | pH | Viscosity (mPa · s) | Crude protein (%) |
| Example 5 | 6.62 | 95 | 4.50 |
| Experimental Example 2 | 6.65 | 104 | 4.52 |

TABLE 7

| | | Tofu-like food | | | | | |
|---|---|---|---|---|---|---|---|
| | | Texture analysis | | | | Sensory evaluation | |
| | TG (%) | Hardness [gw/cm$^2$] | Coagulability [gw · cm/cm$^2$] | Denseness [gw/cm$^2$] | Brittleness | Hardness | Smoothness |
| Example 5-1 | 0.15 | 244 | 137 | 516 | 2.25 | 3.1 | 3.5 |
| Example 5-2 | 0.20 | 297 | 146 | 531 | 2.29 | 3.3 | 3.2 |
| Experimental Example 2-1 | 0.15 | 270 | 152 | 640 | 1.95 | 4.0 | 1.2 |
| Experimental Example 2-2 | 0.20 | 307 | 177 | 779 | 1.93 | 4.3 | 1.6 |

As shown in Table 7, the tofu-like food of Example 5 yielded similar results to those of usual tofu in the sensory evaluations.

On the other hand, the tofu-like food of Experimental Example 2 was sensorily evaluated to be hard in both Experimental Examples 2-1 and 2-2. In general, when tofu is given a score of 3.0 in the evaluation of hardness, the tofu is considered to have usual tofu hardness. Therefore, a score of about 4 in the evaluation means that the tofu was felt to be significantly hard compared with the usual tofu. This is clear from the fact that the denseness value became extremely large with increase in the amount of TG added.

Further, the fact that the food were given scores of 1.2 to 1.6 in the evaluation of smoothness shows that each the food has a drawback in that it lacks smoothness characteristic of fiber-containing tofu. In Experimental Example 2-1 and Experimental Example 2-2, the values for brittleness are as extremely low as 1.95 and 1.93. Therefore, it is considered that the food was felt to be extremely hard and to have very elastic texture unique to TG and no smoothness.

Example 6

150 Kg of domestic soybeans (trade name: Tachinagaha) were dehulled in the same way as in Example 1, and 120 kg of the resultant dehulled soybeans were pulverized so that the cumulative particle size from the minimum particle size of powder particles ($D_{50}$) was 50 μm, to thereby obtain 110 Kg of dehulled soybean powder material. The soybean powder was found to have an "NSI" of 78, a "POV" of 0.9 meq/Kg, an n-hexanal content of 1.5 ppm, and an "LOX value" of 53. Table 8 shows the results.

Water at 18° C. (6 parts by mass) was added to the dehulled soybean powder material obtained above (1 part by mass) and the material was dispersed by stirring to obtain a dispersion, and then the dispersion was heated preliminarily at 115° C. for 5 seconds and immediately subjected to heat treatment at 155° C. for 5 seconds. The resultant was fed to a reduced-pressure chamber to deaerate and cooled to 85° C. After that, the resultant was subjected to emulsification treatment under a pressure of 50 MPa and then cooled to 10° C. or less, to thereby obtain fiber-containing soy milk. The resultant fiber-containing soy milk was found to have no grassy smell, astringent taste, and harsh taste, have no terrible feeling remaining after drinking, be easy to drink, and have a solid matter concentration of 11%. For the resultant fiber-containing soy milk, measurement was performed in the same way as in Example 1. Table 9 shows the results.

Magnesium chloride (0.25%), calcium chloride (0.05%), and TG (0.12%) were added to the fiber-containing soy milk, and the resultant was mixed. A 300 mL-volume PP container was filled with the mixture and sealed. The container was heated at 53° C. for 30 minutes and at 80° C. for 70 minutes and then cooled to 10° C. or less, to thereby obtain tofu-like food. For the resultant tofu-like food, measurement was performed in the same manner as in Example 1. Table 10 shows the results.

The resultant tofu-like food was found to have a hardness of 170, a coagulability of 118, a multi-biting (Rise) denseness of 450, and a brittleness of 2.15 in measurement with TENSIPRESSER, and to be satisfactory as tofu in both hardness, and smoothness. Further, the food was found to have a POV of 5.5 meq/kg and an n-hexanal content of 2.5 ppm and to be tofu being extremely low in unpleasant odor and unpleasant taste and having good taste. In addition, it was possible to store the tofu-like food under an environment of 10° C. or less for 60 days or more.

Meanwhile, fiber-containing soy milk was obtained in the same way as above except that the heating conditions in the preliminary heating of the dispersion were changed to 65° C. and 180 seconds, or 90° C. and 60 seconds, and then tofu-like food was manufactured. As a result, tofu-like food having the same flavor and texture as those described above was obtained.

Example 7

100 Kg of soybeans, which were the same as those in Example 6, were heated using the instantaneous heating dehulling device so that the surface temperature of the soybeans reached 67° C., and then dehulled, to thereby obtain 86 Kg of dehulled soybeans. The dehulling rate in this case was found to be 96%. The dehulled soybeans were pulverized in the same way as in Example 1, to thereby obtain 83 Kg of powder having a cumulative particle size from the minimum particle size ($D_{50}$) of 100 am. The soybean powder was found to have an "NSI" of 81, a "POV" of 1 meq/Kg, an n-hexanal content of 1.8 ppm, and an "LOX value" of 62. Table 8 shows the results.

Water (6 parts by mass) was added to the dehulled soybean powder material obtained above (1 part by mass) and the material was dispersed by stirring, and the dispersion was subjected to heat treatment at 130° C. for 30 seconds. The resultant was fed to a reduced-pressure chamber to deaerate and cooled to 85° C. Next, the resultant was subjected to emulsification treatment under a pressure of 100 MPa and then cooled to 10° C. or less, to thereby obtain fiber-containing soy milk having a solid matter concentration of 12%. For the resultant fiber-containing soy milk, measurement was performed in the same way as in Example 1. Table 9 shows the results.

Magnesium chloride (0.3%) and TG (0.15%) were added to the soy milk obtained above, and the resultant was mixed. A 150 mL-volume PP container was filled with the mixture and sealed. The container was heated at 50° C. for 60 minutes and at 85° C. for 60 minutes, and then cooled to 10° C. or less, to thereby obtain tofu-like food. For the resultant tofu-like food, measurement was performed in the same way as in Example 1. Table 10 shows the results.

The resultant tofu-like food was found to have a hardness of 160, a coagulability of 110, a multi-biting (Rise) denseness of 563, and a brittleness of 2.05 in measurement with TENSIPRESSER, and to be satisfactory as tofu in both hardness and smoothness. Further, the food was found to have a POV of 4.8 meq/Kg and an n-hexanal content of 3.2 ppm and to be tofu being low in both unpleasant odor and unpleasant taste and having good taste. In addition, it was possible to store the tofu-like food under an environment of 10° C. or less for 20 days or more.

Example 8

100 Kg of soybeans, which were the same as those in Example 6, were heated using the instantaneous heating dehulling device so that the surface temperature of the soybeans reached 72° C., and then dehulled, to thereby obtain 84 Kg of dehulled soybeans with a dehulling rate of 95%. Then, the dehulled soybeans were pulverized in the same way as in Example 1, to thereby obtain 81 Kg of powder having a cumulative particle size from the minimum particle size ($D_{50}$) of 37 μm. The soybean powder was found to have an "NSF" of 76, a "POV" of 0.6 meq/Kg, an n-hexanal content of 0.8 ppm, and an "LOX value" of 38. Table 8 shows the results.

The resultant dehulled soybean powder material was dissolved and dispersed in water in the same way as in Example 7, and the dispersion was subjected to heat treatment at 150° C. for 10 seconds and fed to a reduced-pressure chamber to cool the dispersion to 85° C. Subsequently, the dispersion was subjected to emulsification treatment under a pressure of 75 MPa and then cooled to 10° C. or less, to thereby obtain fiber-containing soy milk. For the resultant fiber-containing soy milk, measurement was performed in the same way as in Example 1, and Table 9 shows the results. The fiber-containing soy milk was found to be low in unpleasant odor such as grassy smell and in unpleasant taste such as harsh taste or astringent taste and to be easy to drink.

Tofu-like food was obtained using the resultant fiber-containing soy milk in the same manner as in Example 7, and measurement was performed in the same way as in Example 1. Table 10 shows the results.

The resultant tofu-like food was found to have a hardness of 178, a coagulability of 125, a multi-biting (Rise) denseness of 441, and a brittleness of 2.20 in measurement with TENSIPRESSER, and to be satisfactory as tofu in both hardness and smoothness. The food was found to have a POV of 5.0 meq/Kg and an n-hexanal content of 2.1 ppm and to be tofu being low in both unpleasant odor and unpleasant taste and having good taste.

TABLE 8

| | Dehulling condition | | Soybean powder | | | |
|---|---|---|---|---|---|---|
| | Dehulling method | Dehulling rate (%) | NSI | LOX value | n-Hexanal (ppm) | POV (meq/kg) |
| Example 6 | Instantaneous heating method | 95 | 78 | 53 | 1.5 | 0.9 |
| Example 7 | Instantaneous heating method | 96 | 81 | 62 | 1.8 | 1 |
| Example 8 | Instantaneous heating method | 95 | 76 | 38 | 0.8 | 0.6 |

TABLE 9

| | Fiber-containing soy milk | | |
|---|---|---|---|
| | pH | Viscosity (mPa·s) | Crude protein (%) |
| Example 6 | 6.65 | 29 | 4.54 |
| Example 7 | 6.59 | 70 | 4.63 |
| Example 8 | 6.62 | 58 | 4.65 |

TABLE 10

| | Tofu-like food | | | | | |
|---|---|---|---|---|---|---|
| | | | Texture analysis | | | |
| | POV (meq/kg) | n-Hexanal (ppm) | Hardness [gw/cm$^2$] | Coagulability [gw·cm/cm$^2$] | Denseness [gw/cm$^2$] | Brittleness |
| Example 6 | 5.5 | 2.5 | 170 | 118 | 450 | 2.15 |
| Example 7 | 4.8 | 3.2 | 160 | 110 | 563 | 2.05 |
| Example 8 | 5.0 | 2.1 | 178 | 125 | 441 | 2.20 |

The invention claimed is:

1. A manufacturing method for tofu-like food comprising using a fiber-containing soy milk which is manufactured by a method comprising the following steps of:
   (A) dehulling raw whole soybeans at 65-74° C. to produce dehulled soybeans, and pulverizing the dehulled soybeans using a pulverizer equipped with a pneumatic machine to manufacture a dehulled soybean powder material having a nitrogen solubility index of 75 or more and 90 or less, a lipoxygenase value of 30 or more and 120 or less, an n-hexanal content of 0.5 ppm or more and 2 ppm or less, and a peroxide value of 0.2 meq/kg or more and 3.0 meq/kg;
   (B) dissolving and dispersing the dehulled soybean powder material in water to obtain a dispersion;
   (C) subjecting the dispersion to heat treatment at 120° C. to 160° C. for 1 to 600 seconds; and
   (D) after the step (C), cooling the dispersion to 100° C. or less and subjecting the dispersion to emulsification and dispersion treatment under a pressure of 25 MPa to 200 MPa to produce fiber-containing soy milk.

2. The manufacturing method for tofu-like food according to claim 1, further comprising the following steps of: adding and mixing tofu coagulant and a transglutaminase to the fiber-containing soy milk; and coagulating the resultant by heating to produce fiber-containing tofu-like food.

3. The manufacturing method for tofu-like food according to claim 1, further comprising, before the step (C), a step of subjecting the dispersion to heat treatment at 65° C. to 115° C. for 5 to 180 seconds.

* * * * *